(12) United States Patent
Scriven et al.

(10) Patent No.: US 9,565,315 B2
(45) Date of Patent: *Feb. 7, 2017

(54) SOCIAL NETWORKING-BASED TELECONFERENCING SYSTEM AND METHOD

(71) Applicant: Twalkin, Inc., Santa Monica, CA (US)

(72) Inventors: Thomas Scriven, Santa Monica, CA (US); Anthony Fischler, Santa Monica, CA (US)

(73) Assignee: Twalkin, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,654

(22) Filed: Apr. 28, 2015

(65) Prior Publication Data

US 2015/0249748 A1 Sep. 3, 2015

Related U.S. Application Data

(63) Continuation of application No. 12/877,073, filed on Sep. 7, 2010, now Pat. No. 9,020,472.

(Continued)

(51) Int. Cl.
*H04M 3/56* (2006.01)
*H04L 12/18* (2006.01)
(Continued)

(52) U.S. Cl.
CPC .......... *H04M 3/563* (2013.01); *H04L 12/1822* (2013.01); *H04L 12/588* (2013.01);
(Continued)

(58) Field of Classification Search
CPC .... H04M 3/563; H04M 7/0024; H04M 3/565; H04M 2203/5054; H04M 2203/655; H04M 2203/5009; H04L 67/306; H04L 12/588; H04L 12/1822; H04L 51/32; H04L 12/189
(Continued)

(56) References Cited

U.S. PATENT DOCUMENTS 8,346,864 B1 * 1/2013 Amidon .............. H04L 65/1069
709/204
2003/0225832 A1 * 12/2003 Ludwig .................. G06Q 10/10
709/204

(Continued)

*Primary Examiner* — Chuong A Ngo
(74) *Attorney, Agent, or Firm* — Mintz Levin Cohn Ferris Glovsky and Popeo, P.C.

(57) ABSTRACT

A system and method for creating teleconferences that leverage social networking websites and messaging thereof. The system includes a teleconferencing website hosted on a server for scheduling a teleconference in response to user input, and for generating a message for display on a social networking website. The message includes information about the teleconference and a link to one or more invitees to the teleconference. The system further includes an interactive voice response system for hosting the teleconference to connect at least some of the one or more invitees to the teleconference. The system further includes a client application running on a mobile device associated with each of the at least some of the one or more invitees. The client application receives a notification of the teleconference from the social networking website, and includes a control interface to enable an associated invitee to join the teleconference.

16 Claims, 4 Drawing Sheets

Related U.S. Application Data

(60) Provisional application No. 61/240,145, filed on Sep. 4, 2009.

(51) Int. Cl.
*H04L 12/58* (2006.01)
*H04M 7/00* (2006.01)
*H04L 29/08* (2006.01)

(52) U.S. Cl.
CPC ............ *H04L 51/32* (2013.01); *H04L 67/306* (2013.01); *H04M 3/565* (2013.01); *H04M 7/0024* (2013.01); *H04L 12/189* (2013.01); *H04M 2203/5009* (2013.01); *H04M 2203/5054* (2013.01); *H04M 2203/655* (2013.01)

(58) Field of Classification Search
USPC ..... 455/414.1; 379/211.01, 201.12; 715/753, 715/740; 709/204, 206, 219
See application file for complete search history.

(56) References Cited

U.S. PATENT DOCUMENTS

| | | | |
|---|---|---|---|
| 2006/0067502 A1* | 3/2006 | Bamrah | H04L 12/189 379/211.02 |
| 2008/0132215 A1* | 6/2008 | Soderstrom | H04L 12/1818 455/416 |

* cited by examiner

SOCIAL NETWORKING-BASED TELECONFERENCING SYSTEM AND METHOD

CROSS REFERENCE TO RELATED APPLICATIONS

This application is a Continuation of U.S. patent application Ser. No. 12/877,073, filed Sep. 7, 2010, titled, "Social Networking-Based Teleconferencing System and Method," which in turn claims the benefit of priority under 35 U.S.C. §119 to U.S. Provisional Patent Application Ser. No. 61/240,145, filed on Sep. 4, 2009, entitled, "Social Networking-Based Teleconferencing System and Method", the entire disclosure of each of the aforementioned applications are hereby incorporated by reference herein.

BACKGROUND

This disclosure relates generally to teleconferencing, and more particularly to a teleconferencing system and method that leverages connections and followings formed on social networking websites.

Social networks are pervasive in today's modern Internet ecosystem, and are increasingly becoming the center of Internet user's interaction with others. Businesses, groups, and individuals alike, are becoming aware of the power of Web-based social networks, and are leveraging their power to make connections and foster interaction and communication.

Despite the rapid speed with which many users communicate, or follow web-based social networking information, there is still a largely unmet need for better real-time interaction. For instance, on the Twitter website, users can instantaneously receive "Tweets" or short message service (SMS) messages by other users they follow, but unless the tweeting users are correspondingly following each and every one of their following users, the following users have no way of interacting with the tweeting users in real-time.

Further, text-based communication often lacks a "voice" of the communicator. Subtleties of spoken communication such as tone and inflection, which convey significant information by themselves, are difficult to convey by the written word or typed phrase. Accordingly, what is needed is a system and method that leverages web-based social networking with voice conferencing.

SUMMARY

In general, this document discloses a teleconferencing system and method by which teleconferences can be created via social networking sites, and accessed by any number of invitees through a local client application on a mobile device with telephony capability.

In one aspect, a system and method is presented for creating teleconferences that leverage social networking websites, and messaging thereof. The system includes a teleconferencing website hosted on a server for scheduling a teleconference in response to user input, and for generating a message for display on a social networking website. The message includes information about the teleconference and a link to one or more invitees to the teleconference. The system further includes an interactive voice response system for hosting the teleconference to connect at least some of the one or more invitees to the teleconference. The system further includes a client application running on a mobile device associated with each of the at least some of the one or more invitees. The client application receives a notification of the teleconference from the social networking website, and includes a control interface to enable an associated invitee to join the teleconference.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for teleconferencing, where teleconferences are set up through a social networking website such as TWITTER™, FACEBOOK™, MYSPACE™, LINKEDIN™ or other such web-based social networking platform. The social networking platform may be entirely web based, or may include communications over a wireless network using a mobile device as a user node.

Figure 1:
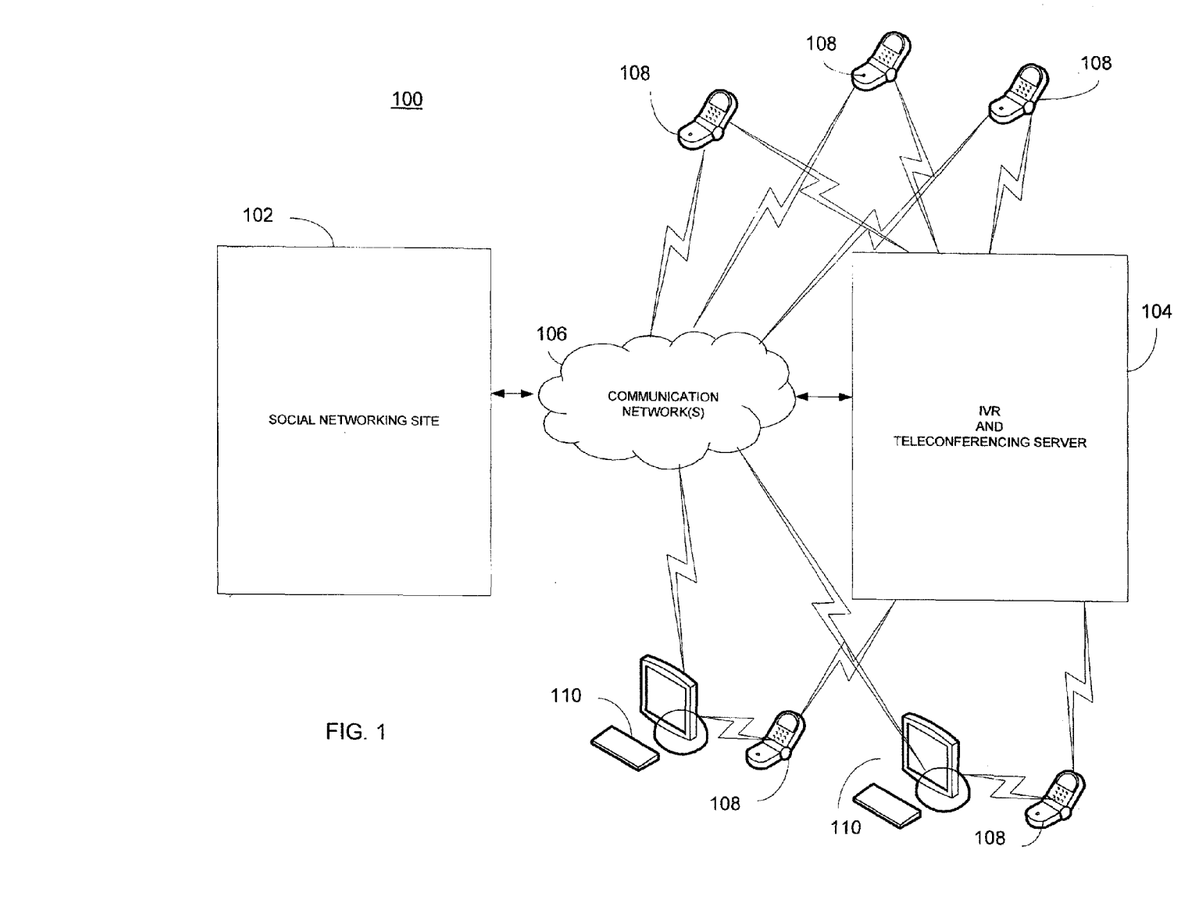
FIG. 1 is a system diagram of a teleconferencing system.

In accordance with preferred implementations, and as illustrated in FIG. 1, a teleconferencing system 100 invites users to use their mobile devices 108 to call into a teleconference. The call-in can be through dialing a number or pressing a command button, or by activating an application that is resident on the mobile device 108, or accessible via the mobile device from a server connected to a wireless communications network 106. Users are notified of an existence of a teleconference from the social networking site 102, or via text message generated from a server associated with the social networking site 102 or associated with an interactive voice response system and teleconferencing server 104.

Teleconferences can be created and executed by a user using a computer 110 connected with the social networking site 102 or with the teleconference server 104. Additionally, the computer 110 can execute an application to enable a user to participate in a teleconference through the computer 110, instead of having to use a mobile device 108.

The teleconferencing system and method transforms an on-line, social networking based conversation, usually via messaging or other text-based exchange, into a real-time voice-based conversation to a predefined group. That group can be a number of users who are called "followers" of individual information contributors to the social network platform.

The teleconferencing system can be implemented by an application that includes one or more APIs. The APIs enable third party developers to easily integrate the teleconferencing system into their own applications for any specific mobile platform such as the IPHONE, ANDROID, or BLACKBERRY mobile device platforms.

Figure 4:
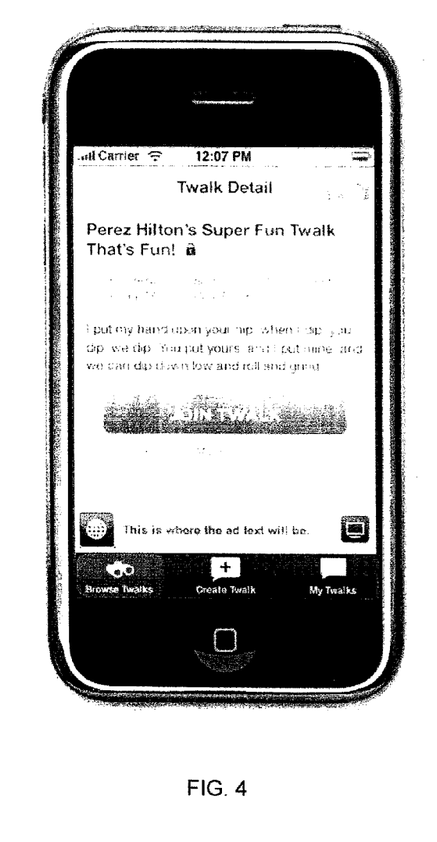
FIG. 4 is an example of a home screen of a client application for accessing teleconferences.

In some implementations, a host of a social networking website can initiate, through clinking one graphical control or pushing one button, an invitation to all of their followers to join that host in a teleconference. Any interested followers can receive the invitation, and clinking one graphical control or pushing one button, can, via their mobile device or other telecommunications device, join the teleconference, as shown in the example client application screen of FIG. 4. Each follower can join the teleconference up to a predetermined amount of time before the teleconference is scheduled to begin.

The teleconferencing system and method can be launched as an application via a link on a website that hosts at least part of the teleconferencing system and method. For example, the link can be generated and provided by a social networking platform and transmitted on the website either privately or publicly. Invitees can be immediately authenticated based only on their phone number that matches a phone number that will likely be used by each invitee to access the teleconference and which has been pre-registered with the system. Accordingly, invitees can sign in to the teleconferencing system using their pre-existing social networking credentials and identifying information.

Hosts of teleconferences are provided a user interface associated with the teleconferencing system, which enables the host control and management over the conference: i.e., who can talk, who may only listen, etc. Further, their user interface can provide a representation, such as the invitees identifier(s), of each participant in the conference, which can be used for further control.

In other implementations, within a conference, such as in down-time before an official start of the conference, or to introduce the conference, a web server can insert messages such as advertisements as an audio stream into the voice network. Further, advertisements can be provided to the website associated with the teleconferencing system, as participants can both participate in the conference on their mobile devices or other telecommunication devices, as well as access a website associated with the conference to get additional information beyond the real-time voice transmissions.

Figure 2:
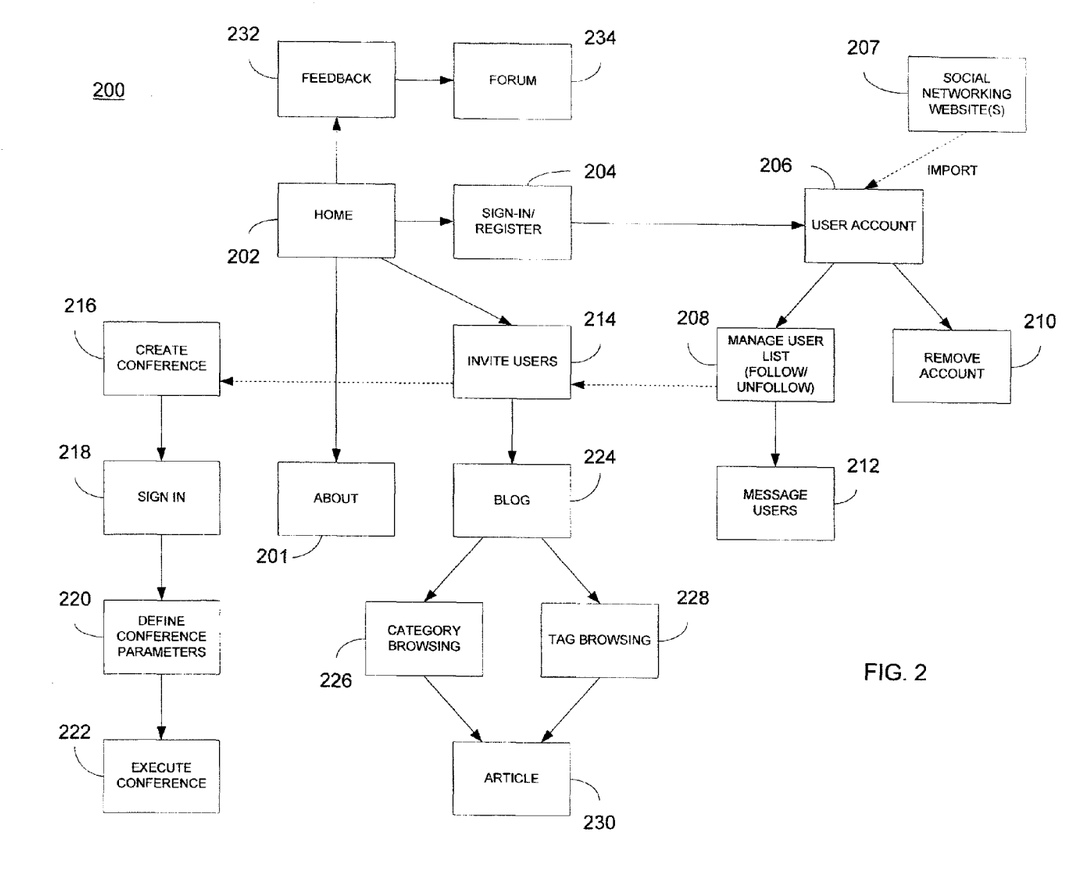
FIG. 2 illustrates a website for creating teleconferences and managing a user base.
Figure 3:
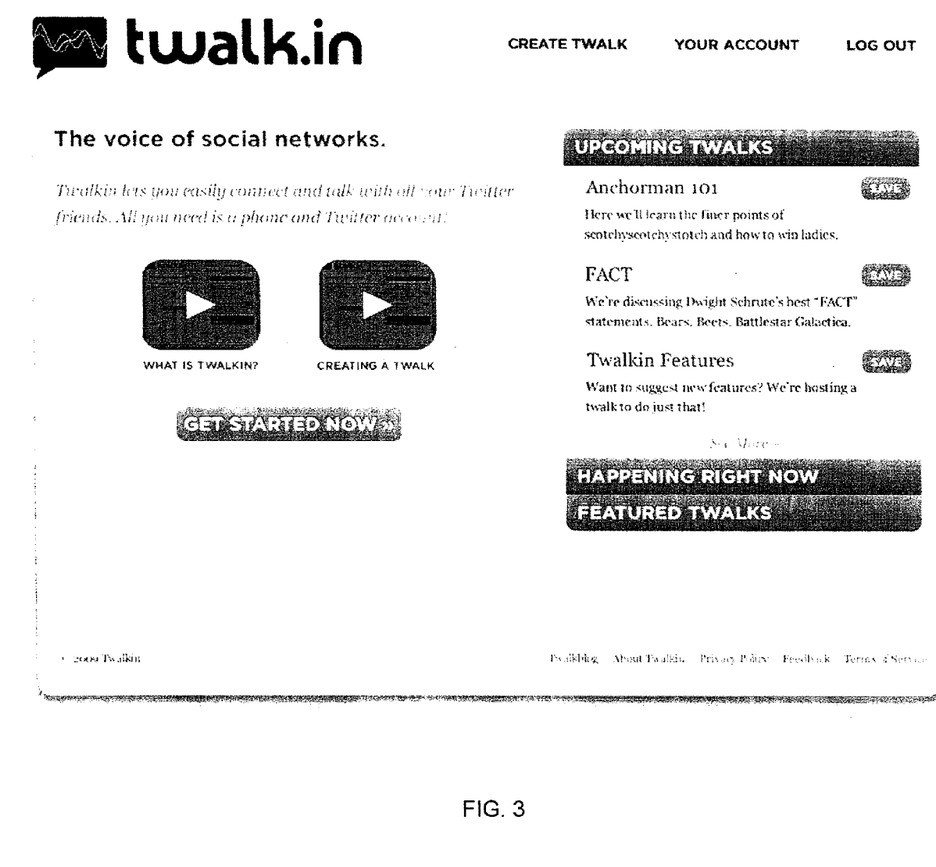
FIG. 3 is an example of a home screen of a website.

FIG. 2 is a functional block diagram of a website 200 for teleconferencing that leverages a social networking website. Website 200 includes one or more windows or pages, referred to herein as "screens." Home screen 202 is preferably a simple graphical screen that invites users to sign in or join the service. Further, users can access one more social networking sites from the home screen 202, of which users may or may not already be members. The home screen 202 can also include a link to a feedback screen 232, in which users can provide feedback about the service, and/or to a forum screen 234 for users to share, log or blog their feedback and opinions on the service. FIG. 3 shows an example home screen 300.

The home screen 202 can also provide links to all or subsets of the teleconferences that are available. Users can filter the teleconferences according to any number of parameters or variables, such as by participating conferee, date, future teleconference, subject matter (key word search), metadata, or any other parameter. Users can also be notified of new teleconferences regularly, via home screen 202, in a periodic or streaming (i.e. as teleconferences are created) manner or feed. By accessing any particular teleconference link, the user is provided more information about the teleconference in about screen 201.

For new or returning users, a sign-in/register screen 204 allows a user to enter or configure their identifying information such as log-on and password. Their identifying information can also correspond to their membership information for any of the number of related social networking websites of which the user is a member or follower. A user account screen 206 enables a user to integrate their teleconferencing capabilities and participation with their preferred social networking sites 207, and can import a user's personal information such as preferences, demographics, etc. A user can remove their account or a link by any of their followers via account remove screen 210, or can manage their account and follower list at a manage user list screen 208.

By accepting followers at the manage user list screen 208, a user can send text messages or graphically-rich messages to any number of their followers (some or all) via message users screen 212. For instance, if a teleconference is set up by a user, that user can have a text message sent to a telephone number associated with each of their followers that have been approved or designated as a participant of the teleconference. The manage user list screen 208 links to an invite users screen 214 through which a creator of a teleconference can invite or designate followers from the system's user base. The system also provides a blog screen 224 for providing a blog about any of the teleconferences, a category browsing screen 226 and tag browsing screen 228 for various types of searches, and an article screen 230 to provide supporting text, graphics, videos, etc. to the teleconferences.

Once users have been invited or designated to follow or participate in a teleconference, a create conference screen 216 enables a creator to schedule the teleconference. This screen 216 allows a user/creator to designate start time and duration. The system can automatically generate a dial-in number or control button or link to send to invited followers, for one-touch access and entry into the teleconference by each follower. Sign-in screen 218 enables teleconference creators to access a particular teleconference, and then define conference parameters (participants, voice capability, mute capability, etc.) via define conference parameters screen 220. The teleconference can be executed on execute conference screen 222.

Those having skill in the art would recognize that the above description of website 200 need not necessarily provide for separate screens for the above functions, and that more than one function can be combined on a screen. Further, the website 200 may offer more or less functions than that described herein. The website 200 can be implemented as an XML or HTML file, and can be rendered in browser on a computer or a mobile computing device, such as a smart phone.

Infrastructure

Website and API Hosting

The Website and API are hosted using highly optimized and multiply redundant equipment. Static content can be hosted using a major Content Distribution Network (CDN). The hosting equipment is preferably located in a multiply redundant data center and the site and its data is backed up using full and incremental backups.

IVR Equipment

Interactive voice response equipment (IVR) is hosted in a Independant Local Exchange Carrier (ILEC). The calls operate on a Communications Server that is maintained through one or more telecom partners and is dedicated specifically for the system.

Website/IVR API Specifications

There are preferably two different sets of APIs, one for the website to communicate with the IVR and visa versa. The website will communicate with the IVR when calls need to be setup/maintained or certain data is requested. The IVR will communicate with the website when events are triggered within a call or by the system. The APIs are implemented as JavaScript Object Notation (JSON) over HTTP using all four verbs (GET/POST/PUT/DELETE). Every Model, like a Call or a Caller, has their own URL and are manipulated in isolation. The API attempts to follow REST principles as much as possible.

Authentication is managed using the Basic Access Authentication HTTP method. Every request must include the Authorization HTTP header. All requests will need to be called using the https protocol. If a request fails, the error information is returned with the HTTP status code. For example, if a requested record could not be found, the HTTP response might look like this:

HTTP/1.1 404 The record could not be found

In general, if a request causes a new record to be created (like a new Call), the response will use the "201 Created" status. Any other successful operation (like a successful query, delete, or update) will use a 200 status code.

Models

A Call houses all of the information required to create or maintain a call.

Call
id: String
telephoneNumbers: Array of String
Will usually have only one number, mainly for future considerations
createdOn: Date Time
startsOn: Date Time
expiresOn: Date Time
isPrivate: Boolean:
authorizedCallers: Array of Caller
isRecorded: Boolean
maxConcurrentCallers: unsigned Integer
0 for unlimited
Caller A Caller includes all of the information required to define a current or future caller.

Caller
id: String
alias: String
Will most likely be Caller's Name or Social Site username (used for convenience)
telephoneNumbers: Array of String
canHear: Boolean
canTalk Boolean
isOnCall: Boolean
Actions—Teleconferencing site to IVR
Call Create Call: POST/calls—Creates a new Call. Response is HTTP status code 201 on success and outputs the JSON serialized Call.

Update Call: PUT/calls/#{call_id}. Updates an existing Call. Response is HTTP status code 200 on success.

Destroy Call: DELETE/calls/#{call_id}. Deletes an existing Call and all associated data. Response is HTTP status code 200 on success.

Get Call: GET/calls/#{call_id}. Gets a Call from the specified Call id. Response is a JSON serialized Call.

List Calls: GET/calls. Lists all Calls currently setup in the IVR. Response is a JSON serialized Array of Call.

Caller

Add Callers to Call: POST/calls/#{call_id}/callers. Adds Array of Caller to an existing call. If a Caller in the Array already exists on the Call, it will be ignored. Response is HTTP status code 201 on success.

Update Caller: PUT/calls/#{call_id}/callers/#{caller_id}. Updates an existing Caller. Response is HTTP status code 200 on success.

Remove Callers from Call: DELETE/calls/#{call_id}/callers. Removes any Caller specified in Array from an existing Call. If a Caller in the Array does not exist on the call, it will be ignored. If a call is in progress, this will kick the user from the call. Response is HTTP status code 200 on success.

List Callers: GET/calls/#{call_id}/callers. Lists all Callers for a specified Call. Response is a JSON serialized Array of Caller.

Actions—IVR to Twalkin

Events

Create Caller Joins Call Event: POST/calls/#{call_id}/callers/{#caller_id}/join. Triggered when a Caller joins a Call. If Caller is anonymous (because Twalk is public), the Caller's telephone number (digits only) should be used as the Caller id. Response is HTTP status code 201 on success.

Create Caller Leaves Call Event: POST/calls/#{call_id}/callers/{#caller_id}/leave. Triggered when a Caller leaves a Call. If Caller is anonymous (because Twalk is public), the Caller's telephone number (digits only) should be used as the Caller ID. Response is HTTP status code 201 on success.

Every teleconference can begin with a user logging into the system's website using their social networking credentials, creating a new teleconference, and inviting other users of a particular social networking site(s) to attend. The invitations are sent out to the invitees as text messages on the respective social networking site(s). The invitees can then use the system's mobile application, a simple one button third party client which supports the system's functionality, or simply dial the teleconference number to attend the teleconference. Once the number is dialed, the system automatically recognizes the phone number the user is calling from and routes them to the appropriate teleconference.

One simple way to grow a user base is to offer a welcoming text message—to which a user would opt-in via voice prompts—to any unregistered callers who use the service for the first time. The caller will be asked to reply to the text message with their social networking identification name (i.e. @username for Twitter) and the system will automatically setup a new account for them with their phone number already associated and all of their social networking information (pictures, bio, etc) pulled over. This hassle-free and simple approach will allow the service to be highly usable and portable.

Teleconferences can be either public or private. Public teleconferences are available to anyone who calls in, and private teleconferences are invite-only. There are three primary types of teleconferences that can be established using the system: 1) conversation: takes place between two people; 2) conference: takes place among a group of two or more people where at least some of the group of people are able to talk at the same time; and 3) broadcast: a large group that has very limited number of the group speaking, and many people of the group listening. Unless specifically allowed, callers are defaulted to muted.

Teleconferences are available in one of generally three ways: 1) real time: a user (host) can set up a teleconference that starts immediately. When the teleconference is finished and the host leaves the call, the teleconference is finished. 2) Scheduled: can be set to take place at any time in the future. 3) Archive: a concluded teleconference that has been recorded and stored in a searchable database. Users can access archived teleconferences by using the "one-touch" mobile application, or by dialing a number with a specific PIN. If the teleconference was private at the time it was recorded, only those users who were invited to the call will be allowed to listen to it as an archive, unless specifically archived as public.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A teleconferencing system comprising:
a teleconferencing website hosted on a first server for scheduling a teleconference in response to user input to a social networking website hosted on a second server and in communication with the first server via a communication network, and for generating an event for being represented on the social networking website, the event including information about the teleconference and being associated with one or more messages for sending to a plurality of users of the social networking website, each of the one or more messages having a link for accessing the teleconference by one or more invitees;
an interactive voice response system for hosting the teleconference to connect at least some of the one or more invitees to the teleconference, wherein the first server and/or the second server is configured to insert an audio stream, which is distinct from the one or more invitees, into the teleconference; and
a client application running on a mobile device associated with each of the at least some of the one or more invitees, the client application receiving at least one of the one or more messages and the link, the client application including a control interface to enable an associated invitee to join the teleconference via the link to the teleconference.

2. The teleconferencing system in accordance with claim 1, wherein the client application is configured to cause the mobile device to dial a dial-in number associated with the teleconference.

3. The teleconferencing system in accordance with claim 1, wherein each of the one or more invitees are associated with a respective mobile device via the teleconferencing website.

4. The teleconferencing system in accordance with claim 1, wherein the teleconferencing website is further configured to enable or disable voice communication by selected invitees of the one or more invitees.

5. The teleconferencing system in accordance with claim 1, wherein the interactive voice response system is further configured to record the teleconference.

6. The teleconferencing system in accordance with claim 1, wherein the audio stream is an advertisement.

7. A teleconferencing system comprising:
a teleconferencing website hosted on a server for scheduling a teleconference in response to user input from a second website, and for generating an event for being represented on the second website, the event including information about the teleconference and being associated with one or more messages for sending to a plurality of users of the second website, each of the one or more messages having a link to one or more invitees to the teleconference;
an interactive voice response system for hosting the teleconference to connect at least some of the one or more invitees to the teleconference, the server being configured to receive and insert an audio stream into the teleconference, the audio stream being generated separately from the teleconference; and
a client application running on a mobile device associated with each of the at least some of the one or more invitees, the client application receiving a notification of the teleconference and the link from the second website, and including a control interface to enable an associated invitee to join the teleconference via the link to the teleconference.

8. The teleconferencing system in accordance with claim 7, wherein the client application is configured to cause the mobile device to dial a dial-in number associated with the teleconference.

9. The teleconferencing system in accordance with claim 7, wherein each of the one or more invitees are associated with a respective mobile device via the teleconferencing website.

10. The teleconferencing system in accordance with claim 7, wherein the teleconferencing website is further configured to enable or disable voice communication by selected invitees of the one or more invitees.

11. The teleconferencing system in accordance with claim 7, wherein the interactive voice response system is further configured to record the teleconference.

12. A teleconferencing method comprising:
receiving social networking credentials from a user of a social networking website to log the user into a teleconferencing system;
receiving, at a teleconferencing website hosted by a server, teleconferencing setup information from the user to set up and schedule a teleconference hosted by an interactive voice response system;
generating, by the website, a text message for display on one or more social networking websites, the text message including information about the teleconference and a link to join the teleconference;
transmitting, to a client application on a voice conferencing device from the one or more social networking websites, the text message and the link to a mobile device associated with selected invitees to enable the selected invitees to access the teleconference hosted by the interactive voice response system via the link to join the teleconference;
receiving, at the website, one or more identifiers identifying one or more selected invitees to the teleconferencing;
receiving, by the website, a request to join the teleconference by associated with each of the one or more identifiers; and
inserting, by the server, an audio stream into the teleconference, the audio stream being generated separately from the teleconference.

13. The method in accordance with claim 12, further comprising recording, by the server, the teleconference.

14. The method in accordance with claim 12, wherein the setup information includes a start time for the teleconference.

15. The method in accordance with claim 12, wherein the setup information includes an identity of a creator of the teleconference.

16. The method in accordance with claim 12, wherein the client application generates an graphical access button to enable the selected invitees to access the teleconference.

* * * * *